(12) United States Patent
Gary

(10) Patent No.: US 7,133,912 B1
(45) Date of Patent: Nov. 7, 2006

(54) SYSTEM AND METHOD FOR MEASURING USAGE OF GATEWAY PROCESSES UTILIZED IN MANAGING NETWORK ELEMENTS

(75) Inventor: Robert Gary, Folsom, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 761 days.

(21) Appl. No.: 09/867,850

(22) Filed: May 29, 2001

(51) Int. Cl.
G06F 15/173 (2006.01)

(52) U.S. Cl. ............ 709/224; 709/223; 709/224; 709/225; 370/401; 705/34

(58) Field of Classification Search ........... 709/229, 709/223, 224, 225
See application file for complete search history.

(56) References Cited

U.S. PATENT DOCUMENTS

| | | | |
|---|---|---|---|
| 5,079,765 A * | 1/1992 | Nakamura | 370/401 |
| 5,583,860 A * | 12/1996 | Iwakawa et al. | 370/232 |
| 5,615,323 A * | 3/1997 | Engel et al. | 345/440 |
| 5,742,762 A * | 4/1998 | Scholl et al. | 709/200 |
| 5,940,376 A * | 8/1999 | Yanacek et al. | 370/250 |
| 6,011,792 A * | 1/2000 | Miloslavsky | 370/352 |
| 6,047,279 A * | 4/2000 | Barrack et al. | 706/60 |
| 6,167,403 A * | 12/2000 | Whitmire et al. | 707/10 |
| 6,188,761 B1 * | 2/2001 | Dickerman et al. | 379/265.01 |
| 6,269,398 B1 * | 7/2001 | Leong et al. | 709/224 |
| 6,295,292 B1 * | 9/2001 | Voit et al. | 370/352 |
| 6,513,129 B1 * | 1/2003 | Tentij et al. | 714/4 |
| 6,664,978 B1 * | 12/2003 | Kekic et al. | 715/733 |
| 6,668,282 B1 * | 12/2003 | Booth et al. | 709/224 |
| 6,678,250 B1 * | 1/2004 | Grabelsky et al. | 370/241 |
| 6,687,748 B1 * | 2/2004 | Zhang et al. | 709/223 |
| 6,744,780 B1 * | 6/2004 | Gu et al. | 370/450 |
| 6,771,673 B1 * | 8/2004 | Baum et al. | 370/535 |
| 6,772,221 B1 * | 8/2004 | Ratcliff et al. | 709/238 |
| 6,775,267 B1 * | 8/2004 | Kung et al. | 370/352 |
| 6,868,399 B1 * | 3/2005 | Short et al. | 705/34 |
| 2002/0165956 A1 * | 11/2002 | Phaal | 709/224 |
| 2003/0009543 A1 * | 1/2003 | Gupta | 709/223 |

FOREIGN PATENT DOCUMENTS

| | | | |
|---|---|---|---|
| EP | 1 049 291 | * | 4/2000 |
| WO | WO 99/49680 | * | 9/1999 |
| WO | WO 03/019871 | * | 6/2003 |

OTHER PUBLICATIONS

U.S. Appl. No. 09/770,427, Secer.
U.S Appl. No. 09/469,025, Tentij.
U.S. Appl. No. 09/816,693, Secer.

* cited by examiner

*Primary Examiner*—Khanh Binh
*Assistant Examiner*—Backhean Tiv

(57) ABSTRACT

A system and method are disclosed which enable measurement of usage of one or more gateways in managing network elements. A system may include at least one gateway that is executable to maintain gateway usage information detailing the amount of usage of such gateway in managing network elements. Gateway usage may include, for example, gateway processing, such as handling of messages received by a gateway from one or more network elements. The gateway(s) may be communicatively coupled to a usage management system and may communicate usage information thereto. An Application Program Interface (API) may be implemented on a gateway, which may provide the functionality for maintaining a count of different types of usage that may occur thereon. The gateway may include software code that invokes the API upon occurrence of a particular type of usage, and the API may maintain a count of such particular type of usage.

26 Claims, 5 Drawing Sheets

*FIG. 4A*
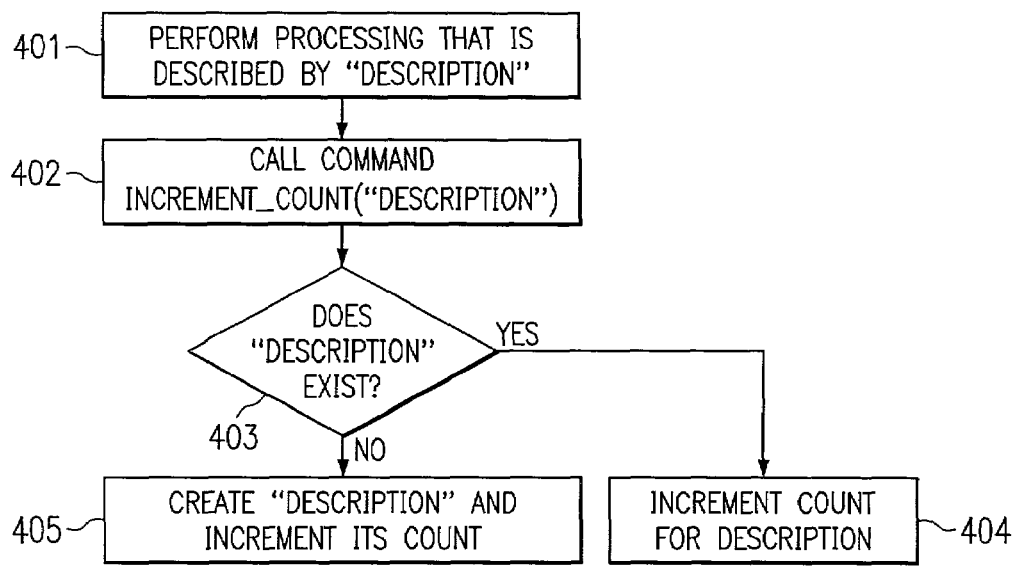
*FIG. 4B*
| DESCRIPTION | COUNT |
|---|---|
| SNMP Get | 5 |
| SNMP Set | 3 |
| SNMP Trap | 9 |
410
*FIG. 5*
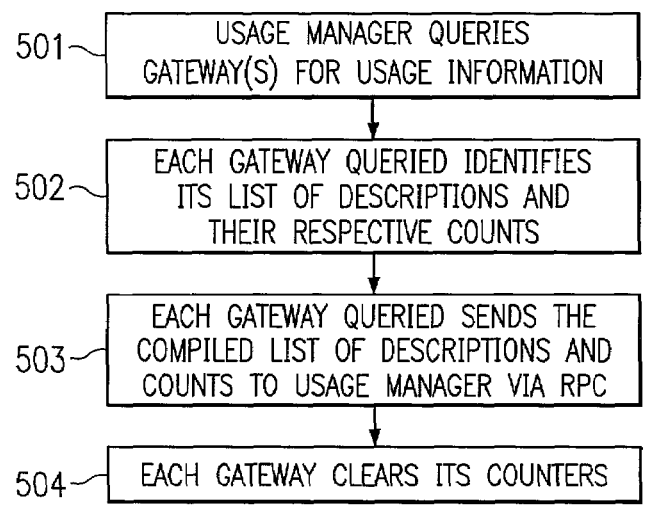

SYSTEM AND METHOD FOR MEASURING USAGE OF GATEWAY PROCESSES UTILIZED IN MANAGING NETWORK ELEMENTS

RELATED APPLICATIONS

This application is related to co-pending application entitled "SYSTEM AND METHOD FOR POLICY-BASED NETWORK MANAGEMENT," assigned Ser. No. 09/469,025, filed Dec. 21, 1999; co-pending application entitled "SYSTEM AND METHOD FOR MANAGING A COMMUNICATION NETWORK UTILIZING STATE-BASED POLLING," assigned Ser. No. 09/770,427, filed Jan. 26, 2001; and co-pending application entitled "OBJECT-DRIVEN NETWORK MANAGEMENT SYSTEM ENABLING DYNAMICALLY DEFINABLE MANAGEMENT BEHAVIOR," assigned U.S. Pat. No. 6,990,518 filed Mar. 22, 2001, all, of which are assigned to a common assignee, the disclosures of which are hereby incorporated herein by reference.

TECHNICAL FIELD

This application relates in general to network management systems, and more specifically to a system and method in which gateway processes are utilized in managing network elements, wherein usage of such gateway processes is measured. For example, the amount of throughput data processed by a gateway process (e.g., the amount of message handling performed by a gateway process) may be measured, which may enable usage-based fee structure to be offered to customers by the provider of such gateway process and may also enable evaluation of the usage of such gateway processes to allow for intelligent decisions to be made regarding, for instance, the proper number of gateway processes to be implemented for a customer's network.

BACKGROUND

The information-communication industry is an essential element of today's society, which is relied upon heavily by most companies, businesses, agencies, educational institutions, and other entities, including individuals. As a result, information service providers such as telephone, cable, and wireless carriers, Internet Service Providers (ISPs) and utility companies all have the need to deploy effective systems suitable for servicing such a demand. Accordingly, network management and operations have become crucial to the competitiveness of communication companies, utilities, banks and other companies operating Wide Area Networks (WANs) of computer devices and/or other network types and devices, including SONET, Wireline, Mobile, Internet Protocol (IP) devices, etcetera. For instance, many companies currently use customized "legacy" network management systems (NMSs) and operations support systems (OSSs). Various implementations of NMSs/OSSs are available in the prior art for managing networks and network elements.

Thus, management systems ("MSs," which encompass both NMSs and OSSs) have been implemented in the prior art for managing communication networks and network elements. Given that it is often desirable to manage various network elements (e.g., various types of devices, including without limitation routers, switches, computer equipment, etcetera), various types of management systems have been developed for managing such elements. Further, because different types of network elements may communicate in different protocols, management systems may utilize different processes for managing different types of network elements. For instance, processes that may be referred to as "gateway" processes are sometimes implemented in management systems for managing particular types of network elements. For instance, a Simple Network Management Protocol (SNMP) gateway process may be implemented for managing SNMP devices, and a Common Management Information Protocol (CMIP) gateway process may be implemented for managing CMIP devices. Thus, one or more gateway processes may be implemented for managing network elements that communicate in a particular communication protocol.

Such gateway processes may, for example, receive unsolicited messages from their respective network elements and/or may poll their respective network elements for certain information. Prior art network management systems commonly recognize faults (or "traps") generated within the network and/or utilize polling of the network elements to provide management. For example, IP and SNMP devices may generate fault messages (which may be referred to as traps), which are unsolicited messages that may be received by the management system. Examples of such trap messages include messages that indicate a network element's CPU utilization is too high, a network element just rebooted, available data storage capacity is low on a network element, and an interface on a network element is down, as examples. Various other types of unsolicited trap messages may be generated by a network element and received by a network management system, as those of ordinary skill in the art will recognize. Such messages are generally generated in a defined protocol, such as SNMP, which the management system can recognize (e.g., a gateway process may recognize) to process the received messages.

Some network management systems may desire information regarding the performance of network elements that is not provided through unsolicited messages generated by such network elements. In such case, gateways may be implemented to poll their respective network elements for particular information. For instance a gateway may be implemented to poll its respective network element(s) to gather information about various operational characteristics of such network element(s). Gateways of prior art systems are typically implemented to periodically poll their respective network elements according to pre-set time intervals. For instance, a gateway may be pre-set to poll its respective network element(s) once every five minutes or once every twenty minutes, as examples. Gateways typically poll network element(s) to request values for various variables detailing information about the operation/performance of the network element(s). For example, a gateway may periodically poll a network element to determine whether the network element is operational and responding to the poll. If a network element fails to respond to such a poll, such failure to respond may be indicative of a problem with the network element, such as the network element having a hardware or software failure. As other examples, a gateway may periodically poll a network element to determine the workload being placed on such network element, the network element's available memory capacity, etcetera.

Depending on the amount of intelligence implemented within such gateway process, it may evaluate the performance of its respective network elements (e.g., based on unsolicited messages and responses to polling) and may trigger certain actions as necessary to manage the network elements. For instance, upon a fault message being received for a particular network element, the gateway process may generate an alert to a network administrator to notify the network administrator of such fault condition. As a further example, once a gateway receives the variable values from the network element(s) in response to a poll, the gateway may then process such variable values to monitor the operation of the network element(s). For instance, if a gateway polls a network element for a response and fails to receive such a response, the gateway may provide an alert to the network administrator (e.g., by presenting an alert message to a computer workstation) notifying the network administrator of a problem with the network element. Similarly, if a gateway polls a network element for its available memory and determines that such network element has little or no memory available, the network administrator may be alerted as to such condition.

Considering the great reliance that may be placed on such gateway processes in management systems for managing network elements, implementations of gateway processes are very important to a management system. Customers of MS providers (or providers of gateway processes for use within MSs) may have several instances of gateway processes executing for managing their network elements. For instance, if a customer (e.g., network provider) needs management of a very large network having many different types of network elements included therein, many instances of gateway processes may be required to be implemented for managing the customer's network.

SUMMARY OF THE INVENTION

In view of the above, gateway processes have been implemented in the prior art for managing network elements. Prior art implementations have failed to provide a mechanism for measuring the amount of processing (e.g., amount of message handling) performed by a gateway process. Thus, a customer typically has no indication as to the amount of processing being performed by the gateway processes implemented for managing the customer's network, and therefore is unable to evaluate the management system to determine, for example, if the gateway processes are at such processing capacity that a new instance of gateway process should be added. Also, customer's are typically charged a fee per instance of gateway process implemented, irrespective of the amount of processing (e.g., amount of message handling) performed by each gateway process. Thus, a customer may be charged the same amount by a MS provider (or gateway process provider) for a gateway process that performs relatively little processing as for a gateway process that performs a great deal of processing.

Additionally a provider of gateways (or MS provider) may be effectively barred from entering certain markets having relatively small customers that are unable or unwilling to pay a relatively large fee to purchase the gateway processes. Thus, relatively small customers may be unable to obtain the gateway processes desired for management of the customers' network elements, and management system providers (or gateway providers) may be unable to recognize potential sales with those customers that are unable/unwilling to pay a relatively large fee per instance of gateway process. Additionally, a gateway provider typically fails to recognize benefits of increased growth of a customer. For instance, if a customer purchases an instance of gateway process, it may use such gateway process for management even as its network grows. Thus, as the amount of processing performed by a gateway process increases, the gateway provider does not reap any benefits of such increase, as the customer has already paid a per-instance based fee for the gateway process. A gateway provider may desire, for example, to offer usage-based fee structure for its gateway processes to customers, which may enable those customers unable/unwilling to pay a large fee typically associated with a per-instance based fee arrangement to obtain the gateway processes under terms more favorable to the customer, and would also enable the gateway provider to reap increased benefits if the amount of usage of the gateway process increases (e.g., if the customer's network grows).

The present invention is directed to a system and method which enable measurement of usage of one or more gateways in managing network elements. According to at least one embodiment, a system for monitoring usage of gateways that are responsible for managing one or more network elements is provided. Such system may include at least one gateway that is executable to maintain usage information detailing the amount of usage of such gateway in managing one or more network elements. In certain embodiments, the gateway(s) may be communicatively coupled to a usage management system and may communicate usage information to such usage management system.

Gateway usage may include, for example, gateway processing, such as handling of messages received by a gateway from one or more network elements. Thus, for instance, in certain implementations a SNMP gateway may be implemented with responsibility for managing one or more SNMP network elements, and the amount of handling of SNMP messages (e.g., SNMP Trap messages, SNMP Set messages, etc.) performed by such SNMP gateway may be tracked.

According to at least one embodiment, an Application Program Interface (API) may be implemented on a gateway, which may provide the functionality for maintaining a count of different types of usage that may occur on the gateway. Additionally, the gateway may include software code that calls (or invokes) the API upon occurrence of a particular type of usage. For instance, in certain implementations, the gateway may, upon performing a particular type of usage, call the API, which will increment a count for that particular type of usage. For example, the gateway may call the API in a manner that communicates a descriptor of the type of usage that occurred, and the API will increment a counter for such descriptor. Thus, for instance, a SNMP gateway may handle a SNMP Trap message and may invoke the API with a descriptor "SNMP Trap," and the API may increment a counter for such "SNMP Trap" descriptor.

In certain embodiments, a usage management system is communicatively coupled to one or more gateways, and such usage management system may poll such gateways for their usage information. Further, the usage management system may, in certain embodiments, compile usage information received from said plurality of gateways into a file. Additionally, the usage management system may electronically communicate received usage information to a recipient.

It should be recognized that measuring gateway usage according to various embodiments of the present invention may provide several benefits. For instance, according to at least one embodiment, usage-based billing may be implemented by a gateway provider. Additionally, according to at least one embodiment, usage information may be evaluated by a provider and/or customer (or gateway user) to determine the load being placed on such gateways, which may enable a provider or customer to determine whether the proper number of gateways are implemented for managing the network elements.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 4A shows an exemplary flow diagram of the operational flow of a gateway according to at least one embodiment of the present invention;

FIG. 4B shows exemplary usage information comprising processing descriptions and their respective counts that may be maintained by a gateway in certain embodiments of the present invention;

FIG. 5 shows an exemplary flow diagram illustrating a canonical operational flow for an embodiment in which the usage management systems periodically query the gateways for usage information;

DETAILED DESCRIPTION

Figure 1:
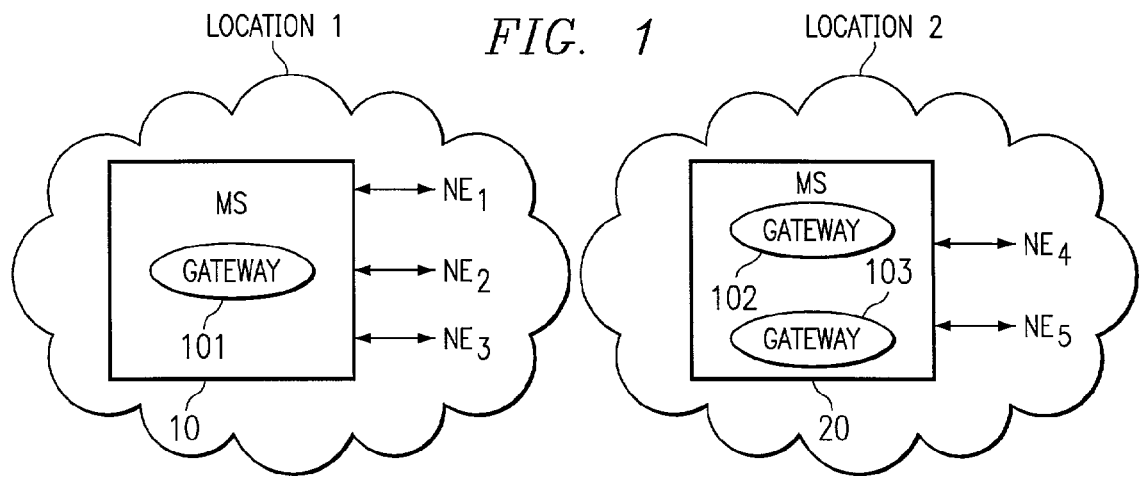
FIG. 1 shows one exemplary implementation of gateway processes within a network management system.

Various embodiments of the present invention are described herein with reference to the above Figs., wherein like reference numerals represent like parts throughout the several views. To better appreciate the various embodiments for measuring gateway usage disclosed herein, it may be helpful for the reader to have an understanding of typical gateway implementations within network management systems. Gateways may be implemented in any of several different arrangements within management systems for polling and/or otherwise monitoring the operations of various network elements. One exemplary implementation of a network management system is shown in FIG. 1. As shown, management system (MS) 10 may be implemented in a first geographical location ("Location 1"), and MS 20 may be implemented in a second geographical location ("Location 2"). For example, geographic Location 1 may be one region of the United States, and geographic Location 2 may be another region of the United States. MS 10 includes gateway process 101, which receives unsolicited messages (traps) and/or polls network element(s) within geographic Location 1 to gather information about various operational characteristics of such network element(s). For instance, in the example of FIG. 1, gateway 101 polls (or requests information from) network elements $NE_1$, $NE_2$, and $NE_3$. Specifically, gateway 101 is implemented to receive unsolicited messages and/or poll such network elements in the appropriate communication protocol. For instance, $NE_1$, $NE_2$, and $NE_3$ may each be SNMP devices, and gateway 101 may be implemented to communicate in SNMP in order to manage such SNMP network elements.

MS 20 includes multiple gateway processes 102 and 103, which may each be implemented to manage network elements within geographic Location 2 that communicate via different communication protocols. For instance, gateway 102 may be implemented to manage SNMP devices, while gateway 103 may be implemented to manage CMIP devices. Thus, for example, $NE_4$ may be a SNMP device, which gateway 102 manages (through receiving unsolicited messages and/or by polling such network element), and $NE_5$ may be a CMIP device, which gateway 103 manages.

In the example of FIG. 1, the gateway processes are not distributed from the network management system, but are instead included within the management system. For instance, gateway 101 is included within MS 10, and gateways 102 and 103 are included within MS 20. As a result, a great operational burden may be placed on such management systems 10 and 20 because all of the poll responses and gateway processing is included within such systems. Additionally, communication traffic to/from the management systems 10 and 20 may become congested, as all necessary communication for managing the network elements of each respective geographic area is directed to/from such management systems 10 and 20.

In some management systems, such as that disclosed in co-pending patent application Ser. No. 09/770,427 entitled "SYSTEM AND METHOD FOR MANAGING A COMMUNICATION NETWORK UTILIZING STATE-BASED POLLING" and co-pending application Ser. No. 09/816,693 entitled "OBJECT-DRIVEN NETWORK MANAGEMENT SYSTEM ENABLING DYNAMICALLY DEFINABLE MANAGEMENT BEHAVIOR," the gateways may be distributed to ease the operational burden on the MS. At least one embodiment of the present invention may be implemented with distributed gateways for managing network elements. An example of such a distributed approach for a network management system is further shown in FIG. 2, which is described herein below. In certain embodiments, state models may be defined/altered by a user (e.g., a system administrator) at a central management system (MS) and then pushed out to the distributed gateways, an example of which is further described in co-pending patent application Ser. No. 09/770,427 entitled "SYSTEM AND METHOD FOR MANAGING A COMMUNICATION NETWORK UTILIZING STATE-BASED POLLING," the disclosure of which has been incorporated herein by reference. For instance, state models may be defined/altered by a user at a centralized MS and then pushed out to one or more distributed gateways via a suitable communication network that communicatively couples the centralized MS to such distributed gateways. Of course, in alternative embodiments state models may not be used for management within the gateways.

Figure 2:
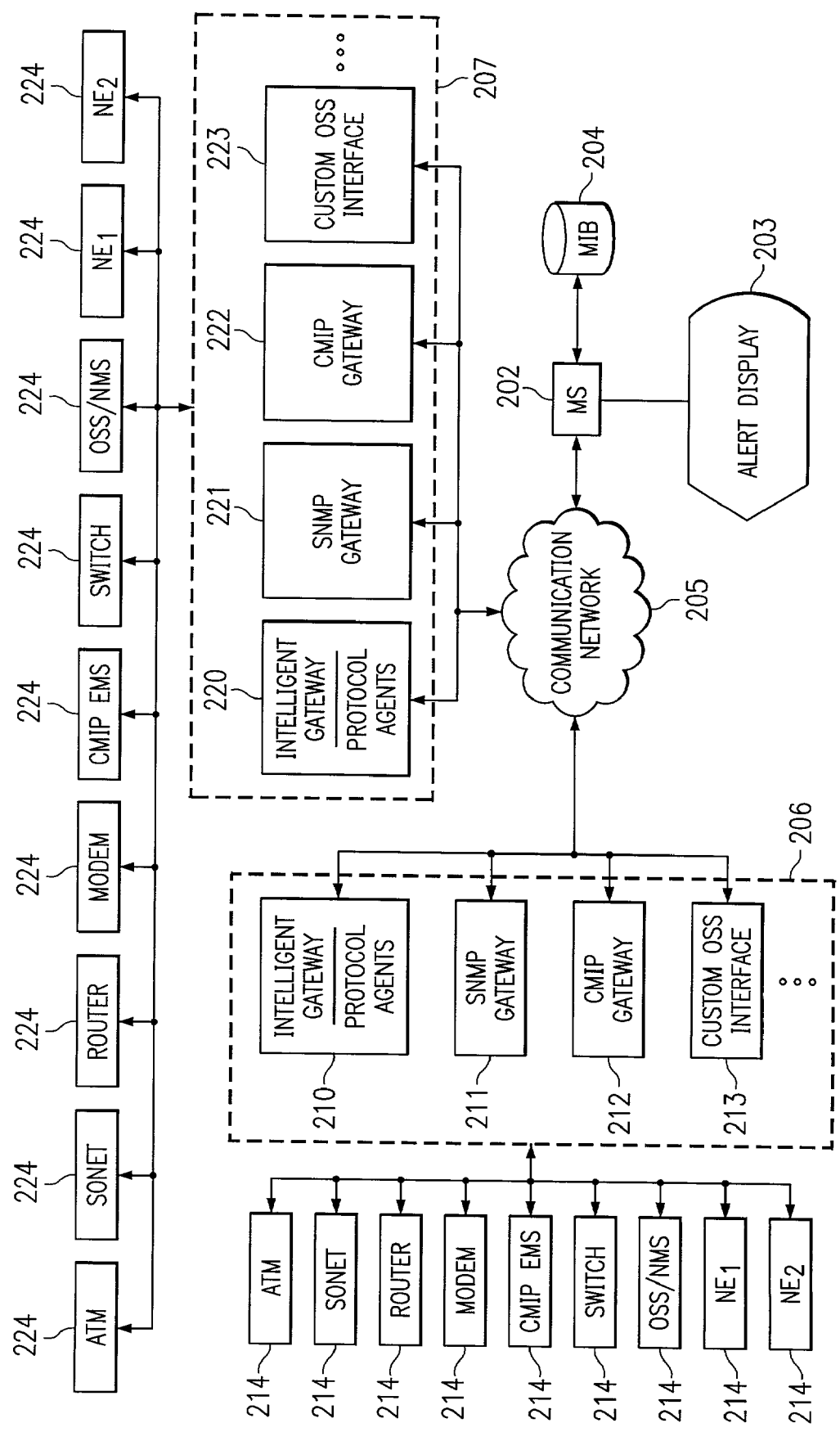
FIG. 2 shows another exemplary implementation of gateway processes within a network management system, wherein such gateways are implemented in a distributed fashion.

As shown in FIG. 2, central MS 202 may be communicatively coupled to numerous gateways distributed about the network for managing various network elements. As shown, central MS 202 may be communicatively coupled to distributed gateways or groups of distributed gateways via communication network 205. Communication network 205 may be any suitable type of communications network including, but not limited to direct computer to computer connection, a wide area network (WAN), modem to modem connection, the Internet, a combination of the above, or any other communications network now known or later developed within the networking arts which would permit communication between centralized MS 202 and distributed gateways.

For example, gateway group 206 may be implemented at one geographic location of a managed network and group 207 may be implemented at another geographic location of such managed network. Group 206 may include various gateways for monitoring (e.g., polling) particular types of network elements. For instance, each gateway within group 206 may monitor network elements having particular communication protocols, including as examples intelligent gateway 210, SNMP gateway 211, CMIP gateway 212, and custom OSS interface gateway 213, which may monitor various network elements 214, such as ATMs, Sonets, routers, modems, CMIP EMSs, switches, OSSs/NMSs, as well as various other network elements local to group 206. Likewise, group 207 may include various gateways for monitoring (e.g., polling) particular types of network elements. Each gateway of group 207 may monitor network elements having particular communication protocols, including as examples intelligent gateway 220, SNMP gateway 221, CMIP gateway 222, and custom OSS interface gateway 223, which may monitor various network elements 224, such as ATMs, Sonets, routers, modems, CMIP EMSs, switches, OSSs/NMSs, as well as various other network elements local to group 207. Each of the distributed gateways may, for example, be any suitable processor-based device operable to manage (e.g., receive unsolicited messages and/or poll) its respective network elements.

In a preferred embodiment, data collected by the distributed gateways may be communicated to central MS 202. For example, polling services (which may include state models) may be loaded onto the distributed gateways of groups 206 and 207, and such gateways may execute the polling services to monitor their respective network elements. In this manner, the gateways can act as filters by only communicating necessary data about the network elements back to central MS 202, thereby alleviating much of the processing and communication traffic burden from central MS 202.

The management system of various embodiments of the present invention is preferably object-driven. An example of such an object-driven management system is further described in co-pending patent application Ser. No. 09/816,693 entitled "OBJECT-DRIVEN NETWORK MANAGEMENT SYSTEM ENABLING DYNAMICALLY DEFINABLE MANAGEMENT BEHAVIOR," the disclosure of which has been incorporated herein by reference. For instance, network elements and management behavior are preferably represented by objects within the management system. Such objects may be stored in management information base (MIB) 204, which may, for instance, be a database or other suitable data storage management. MIB 204 is communicatively coupled to central MS 202. More specifically, MIB 204 may be integrated within or external to central MS 202, and a management process executing on central MS 202 is capable of accessing MIB 204 to store/retrieve objects. Also, as shown in FIG. 2, one or more alert displays 203 (e.g., work stations equipped with input and output devices) may be communicatively coupled to central MS 202 for enabling interaction with a user (e.g., a network administrator).

Because various embodiments utilize objects to define management behavior, the management system of such embodiments provides great flexibility in allowing objects to be created/modified in order to dynamically define management behavior. Additionally, objects may have an attribute specifying the relationship of such objects to the network elements and/or gateways. That is, a behavior object preferably includes a relationship attribute defining the relationship of the behavior within the managed network. Accordingly, upon an object being created/modified, the central MS may determine to which gateways and/or network elements the object relates and implement the management behavior defined by such object for the related network elements and/or gateways. For instance, a user (e.g., network administrator) may define a management behavior, such as management behavior responsive to particular trap messages or management behavior for polling network elements. The user may specify one or more distributed gateways which need to execute the defined management behavior (e.g., need to respond to particular trap messages or perform defined polling activities), and such gateways may be identified in a relationship attribute of the object defining the management behavior. As a result, central MS 202 may communicate (e.g., "push") the created management behavior (e.g., the object defining such management behavior) to the appropriate gateways to which the management behavior relates. Thereafter, a user may modify the management behavior at the central MS 202, and such modification is then automatically communicated to the appropriate gateways.

According to various embodiments of the present invention, the amount of usage of gateways may be monitored. Accordingly, measuring the usage of gateways enables the potential for usage-based billing to be implemented by a provider of such gateways and may also enable users of such gateways to evaluate their performance (e.g., to determine whether their processing capacity is so high that additional gateways should be implemented), as examples. In certain embodiments, a usage management system (or "usage manager") may be implemented to track usage of gateways. According to at least one embodiment, monitoring of gateway usage is achieved (at least in part) by polling the distributed gateways. For instance, in one embodiment, a usage management system may be implemented to periodically poll the distributed gateways for information about their usage. In certain embodiments, such usage management system may be implemented within the central MS. It should be understood that according to various embodiments, rather than (or in addition to) the usage management system being implemented at the central MS, such usage management system may be a separate system that is communicatively coupled to the central MS. For instance, in certain embodiments, a usage management system may be implemented at each of the locations at which gateways are distributed.

Figure 3B:
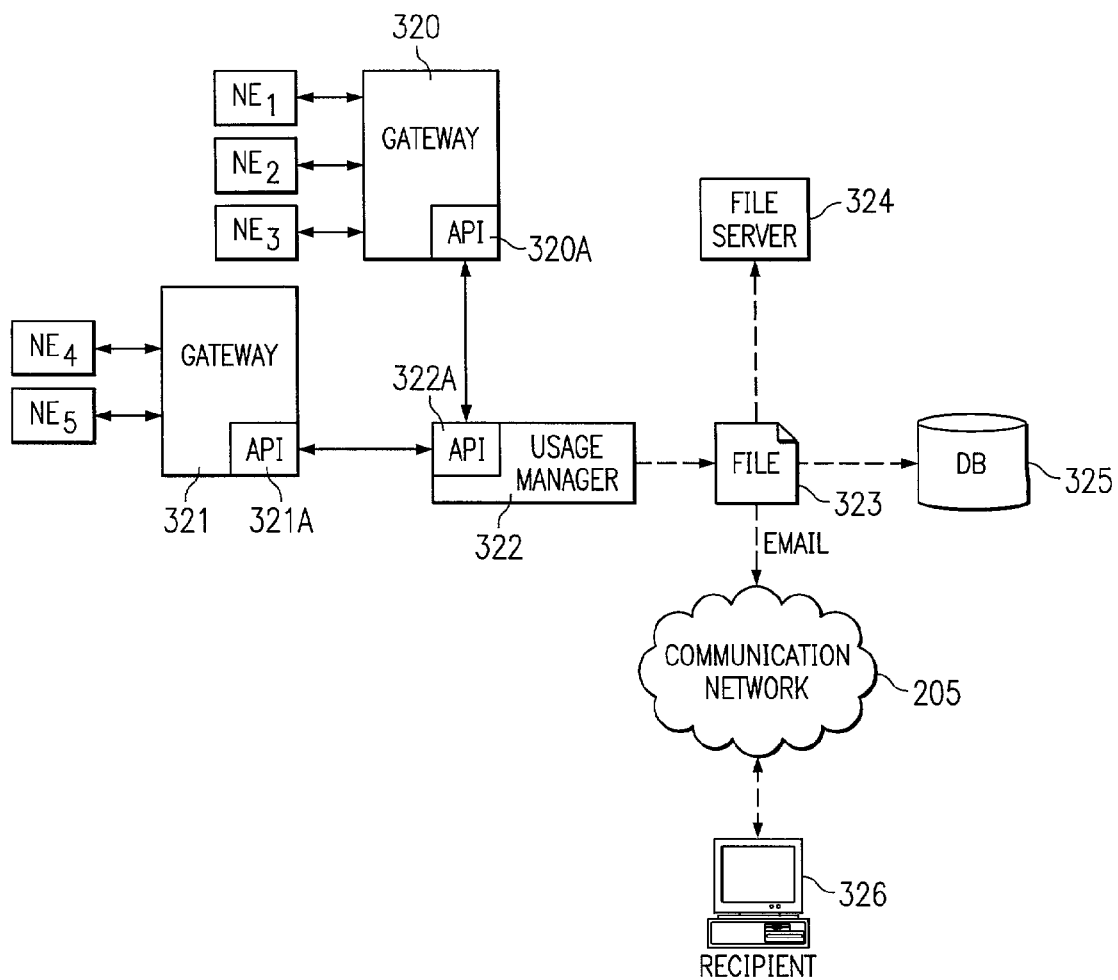
FIG. 3B further shows an canonical implementation of a usage measurement system that may be implemented according to various embodiments of the present invention.
Figure 3A:
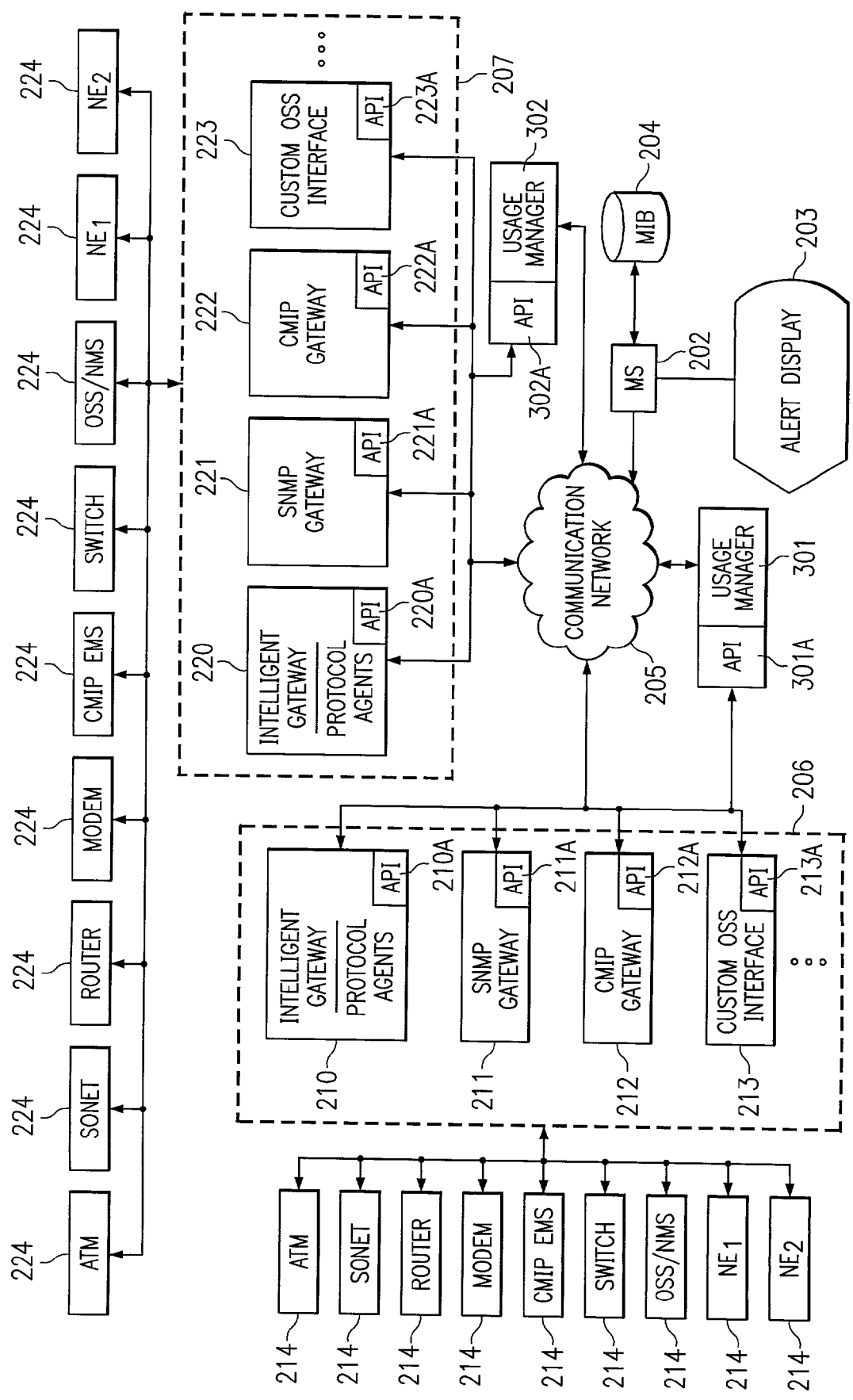
FIG. 3A shows an exemplary implementation of usage management systems included within the distributed management system of FIG. 2.

FIG. 3A shows an exemplary implementation of usage management systems included within the distributed management system of FIG. 2. In the example of FIG. 3A, usage management system 301 is arranged to monitor usage of gateway group 206, and usage management system 302 is arranged to monitor usage of gateway group 207. Such usage management systems 301 and 302 may comprise any suitable processor-based device executable to collect and/or process usage information from their respective gateways.

For instance, according to certain embodiments, usage management systems 301 and 302 may each comprise a processor-based device operable to execute instructions for querying (or "polling") their assigned gateways for their respective usage information. Alternatively (or additionally), in certain embodiments, usage information may be communicated from the gateways to usage management systems 301, 302 in an unsolicited manner (e.g., without usage management systems 301, 302 querying the gateways for usage information), and any such embodiment is intended to be within the scope of the present invention. Usage management systems 301 and 302 may further comprise memory to which gateway usage information and/or polling instructions may be stored, as examples. The term "memory" is used broadly herein, and is intended to encompass any suitable data storage device now known or later discovered, including as examples random access memory (RAM), disk drives, floppy disks, optical discs (e.g., Compact Discs (CDs) and Digital Versatile Discs (DVDs)), and other data storage devices.

As shown in the example of FIG. 3A, usage management systems 301 and 302 are communicatively coupled to central MS 202 via communication network 205. Accordingly, in certain implementations, polling instructions to be executed by such systems 301, 302 in querying their respective gateways and/or other instructions to be executed by such systems 301, 302 in processing usage information collected from their respective gateways may be communicated to systems 301, 302 from central MS 202. Also, upon gateway usage information being collected by usage management systems 401 and 402, such usage information may be communicated therefrom to central MS 202 via communication network 205.

As further shown in FIG. 3A, according to at least one embodiment of the present invention, an Application Program Interface (API) is implemented on each gateway and usage management system. More specifically, APIs 210A, 211A, 212A, and 213A are implemented on gateways 210, 211, 212, and 213, respectively, and APIs 220A, 221A, 222A, and 223A are implemented on gateways 220, 221, 222, and 223, respectively. Similarly, APIs 301A and 302A are implemented on usage management systems 301 and 302, respectively. Utilizing a common API implemented on each of the various different gateways and usage management systems enables usage information to be collected and communicated in a consistent manner for each of various different types of gateways that may be implemented for managing different types of network elements. The API provides a common programming interface with tools that developers of each gateway type may use to relatively easily collect usage information that may be communicated in a recognizable protocol to a usage management system. According to at least one embodiment, the API is a function that is available in a library accessible to the gateways, which provides the functionality for tracking and reporting usage (e.g., counts of messages handled by a gateway) so that a gateway developer is not required to implement such functionality within the gateway process. Rather, a gateway developer may include code that calls the function provided by the API upon usage of the gateway (e.g., upon the gateway handling a particular type of message) to indicate an updated count for such usage.

Turning to FIG. 3B, an canonical implementation of a usage measurement system is further shown. In the example of FIG. 3B, gateway 320 is implemented to manage network elements NE1, NE2, and NE3, and gateway 321 is implemented to manage network elements NE4 and NE5. Thus, for instance, such gateways may receive unsolicited messages from their respective network elements and/or may poll their respective network elements for information. Gateway 320 may be implemented with an API 320A, and gateway 321 may also be implemented with a like API 321A. Usage management system 322 is implemented for collecting usage information from gateways 320 and 321. Usage management system 322 may also be implemented with an API consistent with the API of gateways 320 and 321, shown as API 322A. Thus, code may be implemented on gateways 320 and 321 that enables them to collect information about their usage. For instance, gateways 320 and 321 may collect information as to the amount of their respective processing of information, such as information about the amount of messages that they handle in managing their respective network elements and/or information about the amount of throughput of data for each gateway, as examples.

According to certain embodiments of the present invention, usage management system 322 periodically queries gateways 320 and 321 for their respective usage information. That is, gateways 320 and 321 may log their respective usage information until usage management system 322 polls them for such usage information, at which time gateways 320 and 321 may communicate their logged usage information to usage management system 322. According to other embodiments, gateways 320 and 321 may communicate (e.g., periodically) their respective usage information to usage management system 322 without usage management system 322 soliciting such usage information. Once usage information is collected by usage management system 322, it may write the usage information to file 323. In certain embodiments, usage information for a plurality of different gateways may be compiled into a common file 323. For instance, usage management system 322 may compile usage information for both gateways 320 and 321 into file 323.

Once usage management system 322 collects usage information for its respective gateways, it may handle the usage information in various ways. For example, the usage information compiled in file 323 may be stored to file server 324, written to a database 325, and/or communicated (e.g., via email) to a recipient device via communication network 205. For instance, in one embodiment, the usage information may be compiled in file 323, which may be attached to an email that is communicated from usage manager 322 to recipient 326 via communication network 205. For example, recipient 326 may be a provider of gateways 320 and 321, which charges the customer a usage-based fee, and therefore the provider may be able to determine from the received email the amount of usage and thus the proper fee to charge the customer.

Turning to FIG. 4A, an exemplary flow diagram is provided that shows the operational flow of a gateway according to at least one embodiment of the present invention. That is, in certain embodiments, a developer may implement code (utilizing a common API) on each of different types of gateways that may be utilized, and such code may generally follow the operational flow of FIG. 4A. In operational block 401, the gateway performs some type of processing (e.g., message handling), which is described by a "Description." For example, if a SNMP gateway receives a SNMP trap message from a network element, the gateway may call an API and pass the description "SNMP Trap" to such API, and the API maintains a count of such "SNMP Trap" messages handled by the gateway. As another example, if a SNMP gateway receives a response from an SNMP Get request, it may call an API and pass the description "SNMP Get" to such API, and the API maintains a count of such "SNMP Get" messages handled by the gateway.

According to at least one embodiment, the "description" used to identify a particular type of usage (e.g., particular type of message handling) may be hard coded in the gateway's software application based on the context. For instance, if the gateway is processing an SNMP Get response, the gateway code may include a hard coded call to Increment_Count("SNMPGet"), wherein Increment_Count calls a usage counting function of the API and "SNMPGet" is a description of the type of usage of the gateway to be counted. As a further example, if the gateway identifies a text message from a TL1 connection, the code may call Increment_Count("TL1 Event"). In certain embodiments, upon being invoked and receiving a description of a type of usage, the software code of the API may check to see if its received such description before. If it has not received such a description before, it creates a new category of type of usage (or new description), otherwise it increments the existing count for the description. According to various embodiments of the present invention, a gateway developer (e.g., programmer) can use any description he desires for a particular type of usage, as the API code does not have any restrictions or pre-knowledge of valid description name(s) for a particular type of usage. However, once the API receives a particular description, it will manage (e.g., keep track of counts, clear the count when necessary, etc.) the description.

At block 402, the gateway executes a function to increment a counter for the particular "Description" processing. For example, the gateway may execute a command "Increment_Count("Description")." Responsive to such function, the gateway determines whether the "Description" has been previously identified, at block 403. For instance, the gateway may determine whether a record has been created in a database for such "Description" or whether such "Description" identifier is otherwise stored in the gateway's memory. If determined that the Description identifier does exist in the gateway's memory, then the count associated with such Description identifier is incremented at block 404. If, on the other hand, it is determined at block 403 that the "Description" counter has not been previously identified by the gateway (i.e., the gateway has no record of such "Description" identifier), then operation advances to block 405 whereat the gateway executes to create a record for "Description" and increments its associated counter to reflect performance of such processing in block 401.

FIG. 4B shows exemplary usage information (e.g., records) 410 comprising processing descriptions and their respective counts that may be maintained by a gateway. Usage information 410 may be arranged in any suitable manner for storing data, including without limitation a data structure, database entries, written to a flat file, etcetera. In the example of FIG. 4B, usage information 410 includes descriptions "SNMP Get," "SNMP Set," and "SNMP Trap," which have counts 5, 3, and 9, respectively. Accordingly, in this example, the gateway on which usage information 410 is stored has performed 5 "SNMP Gets," 3 "SNMP Sets," and 9 "SNMP Traps." Of course, in various embodiments, any type of description may be included to correspond to a particular type of gateway usage (or gateway processing). For instance, such descriptions as "TL1 Event," "CMIP Event," and any other description of a particular type of processing that may be performed by a gateway may be included with a corresponding count of the number of times the gateway has performed such type of processing. In certain embodiments, such usage information 410 may be communicated to a usage management system (e.g., in response to a query of the gateway for such usage information from the usage management system), and upon communicating usage information 410 to the usage management system, the gateway may clear the counts (or "zero" the counts) for each description and begin keeping a new count for each type of processing encountered.

According to one embodiment, usage management systems periodically query (or poll) their respective gateways for usage information. An exemplary flow diagram illustrating a canonical operational flow for an embodiment in which the usage management systems query the gateways for usage information is shown in FIG. 5. The flow diagram of FIG. 5 is described hereafter with reference to the elements shown in the embodiment of FIG. 3B. As shown, usage management system 322 may, at operational block 501, query gateways 320 and 321 for their usage information. At operational block 502, each of the queried gateways 320 and 321 identifies its usage information (e.g., a list of descriptions and their respective counts). For instance, each gateway's respective usage information, such as usage information 410 of FIG. 4B, may be stored local to such gateway, and each gateway may access its information and gather it into a proper form for communication to usage management system 322. At operational block 503, each of the queried gateways 320 and 321 sends the compiled usage information to usage management system 322. According to certain embodiments, such usage information is communicated to usage management system 322 via remote procedure call (RPC). Once each gateway 320 and 321 communicate their respective usage information to usage management system 322, such gateway may clear its counters (e.g., zero out the counters) for each of its processing type descriptions, at block 504.

Figure 6:
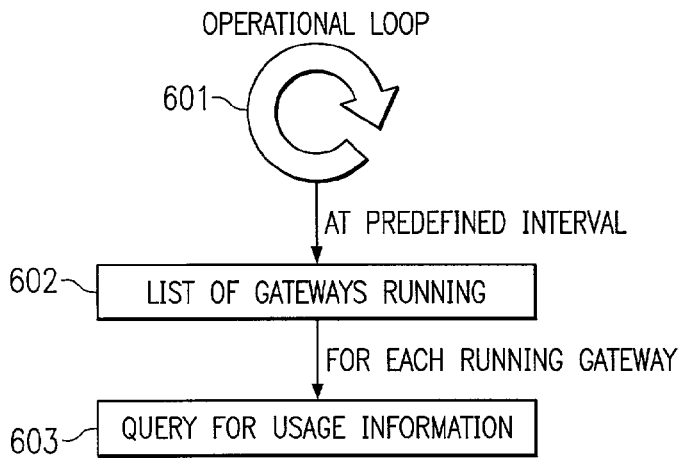
FIG. 6 shows a canonical operational flow diagram of the operational flow of a usage management system according to at least one embodiment of the present invention.

FIG. 6 shows a canonical operational flow diagram showing the operational flow of a usage management system according to at least one embodiment of the present invention. The flow diagram of FIG. 6 is described hereafter with reference to the elements shown in the embodiment of FIG. 3B. Usage management system 322 has an operational loop 601 executing thereon (which may be referred to herein as its main process). At predefined intervals (which may, in certain embodiments, be user-definable), usage management system 322 accesses its list of running gateways for which it has been assigned responsibility, at operational block 602. Thus, for instance, usage management system 322 may maintain a list a running (currently operational) gateways for which it is responsible for monitoring usage information. In the example of FIG. 3B, such list of gateways for which usage management system 322 maintains may include gateways 320 and 321. For each gateway identified in block 602, usage management system 322 queries (or polls) such gateway for its usage information at operational block 603. For example, usage management system 322 may communicate a query for usage information to each of gateways 320 and 321. In certain embodiments, API 322A enables such query of usage information from various different types of gateways. For instance, gateway 320 may be a SNMP gateway, while gateway 321 is a CMIP gateway, and both may be queried for their usage information by usage management system 322.

Figure 7:
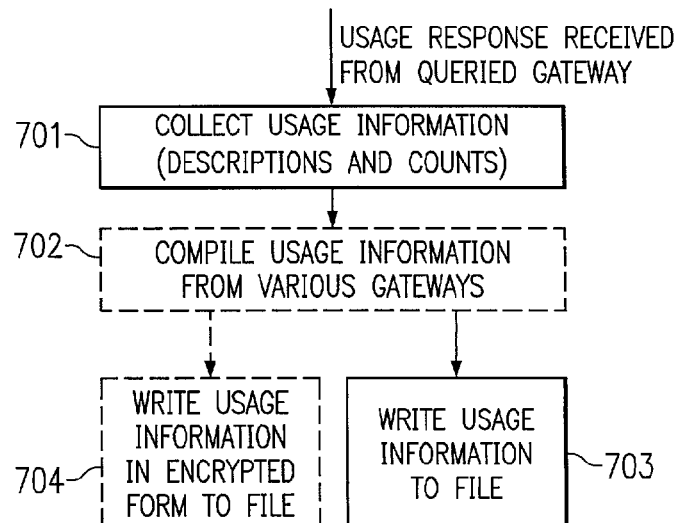
FIG. 7 shows an exemplary operational flow diagram which further illustrates the operational flow of a usage management system according to at least one embodiment of the present invention.

Turning now to FIG. 7, an exemplary operational flow diagram is provided which further shows the operational flow of a usage management system according to at least one embodiment of the present invention. Responsive to the queries issued by usage management system 322 in block 603 of FIG. 6, usage management system 322 receives usage information from the queried gateways 320 and 321. However, the usage information may be received from each queried gateway at different times. For instance, when usage management system 322 queries gateway 320 it may be idle, and therefore able to respond with its usage information very quickly. However, when usage management system 322 queries gateway 321, it may be extremely busy (e.g., polling and/or processing data received from $NE_4$ and $NE_5$), and therefore may be unable to respond with its usage information until a later time. At operational block 701, usage management system 322 collects the received usage information (e.g., descriptions and corresponding counts) received from the queried gateways 320 and 321. In certain embodiments, usage management system 322 may, at block 702, compile usage information from various gateways. For instance, in one implementation, usage management system 322 may compile usage information received from gateways 320 and 321 into a common report (or file). Further, in certain implementations, usage management system 322 may perform various types of processing on the received usage information. Such processing includes comparing the usage information of various queried gateways, generating a report (or file) showing such comparison of the queried gateways, summing the counts for like types of processing received from various queried gateways, and executing a billing algorithm to compute the amount to be billed for the usage of the gateways, as examples.

At operational block 703, usage management system 322 writes the received usage information and/or information computed by usage management system 322 utilizing such received usage information (e.g., billing information, comparison reports, etc.) to a file, which may be a database file, flat file, etcetera. In certain embodiments, usage management system 322 may, in block 704, write usage information and/or information computed by usage management system 322 utilizing such received usage information to a file in an encrypted format. Such encrypted file may then be communicated via email to one or more recipients (e.g., a provider of the gateway processes, the customer utilizing such gateway processes in the management of the customer's network, etc.) in a secure fashion.

Figure 8:
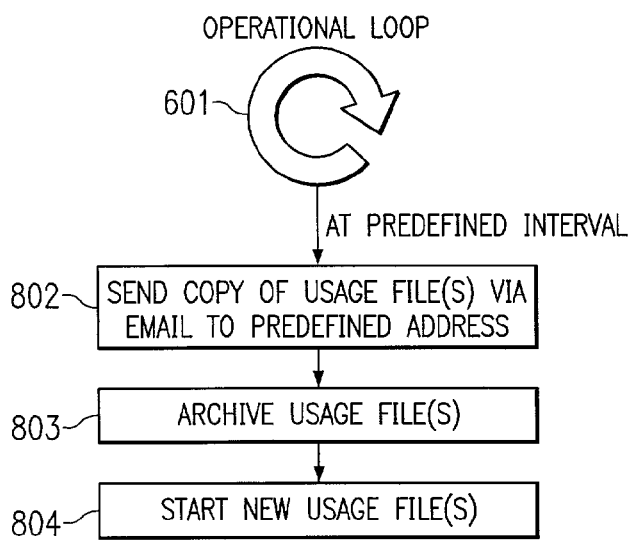
FIG. 8 shows an exemplary operational flow diagram which further illustrates the operational flow of a usage management system according to at least one embodiment of the present invention.

Turning now to FIG. 8, an exemplary operational flow diagram is provided which further shows the operational flow of a usage management system according to at least one embodiment of the present invention. Usage management system 322 has an operational loop 601 executing thereon (which may be referred to herein as its main process). At predefined intervals (which may, in certain embodiments, be user-definable), usage management system 322 sends a copy of compiled usage file(s) via email (or other suitable communication medium, including without limitation facsimile transmission) to a predefined recipient address(es), at operational block 802. In certain embodiments, the predefined recipient addresses may be user-definable. For instance, a user may interact with usage management system 322 directly or indirectly (e.g., may interact with usage management system 322 via MS 202 of FIG. 3A) to define recipient addresses (e.g., email address and/or fax number, etc.) to which the compiled usage file(s) are to be communicated. At operational block 803, usage management system 322 may archive the compiled usage file(s) by, for example, writing such usage file(s) to a file server or other suitable storage device. At block 804, usage management system 322 may create new usage file(s) for its respective gateways and begin compiling information thereto.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for determining if at least one gateway is at a pre-selected processing capacity, said system comprising:
    said at least one gateway being responsible for managing one or more network elements, said at least one gateway communicatively coupled with one or more network elements;
    said at least one gateway measuring an amount of processing performed by said at least one gateway;
    a usage management system communicatively coupled to said at least one gateway, wherein said at least one gateway is operable to communicate said amount of processing performed to said usage management system; and
    a management system capable of determining if said at least one gateway is at said pre-selected processing capacity based on the measured said amount of processing performed.

2. The system of claim 1 wherein said amount of processing performed includes an amount of message handling.

3. The system of claim 2 wherein said at least one gateway includes a Simple Network Management Protocol (SNMP) gateway responsible for managing one or more SNMP network elements, and wherein said amount of message handling includes handling of SNMP messages.

4. The system of claim 1 wherein said at least one gateway includes code executable to track said measured amount of processing performed by said at least one gateway.

5. The system of claim 4 wherein said code includes code implemented within an Application Program Interface (API)

that includes functionality that can be invoked to increment and maintain a count of one or more types of processing performed by said at least one gateway.

6. The system of claim 1 wherein said at least one gateway includes code executable to track amounts of different types of processing of said at least one gateway by incrementing a count maintained for a particular one of said amounts of different types of processing, wherein said different types of processing includes handling of different types of messages from said one or more network elements.

7. The system of claim 1 wherein said usage management system is communicatively coupled to a plurality of gateways and is operable to poll said at least one gateway for said amount of processing to determine the measured amount of processing, and to compile the measured amount of processing into a file and provide said file to a recipient.

8. The system of claim 1 wherein said usage management system is implemented on a common platform with said management system.

9. A system as in claim 1, wherein said usage management system charges a user of said at least one gateway a fee based on said amount of processing performed.

10. A method for monitoring an amount of processing performed by one or more gateways that are responsible for managing one or more network elements, said method comprising the steps of:
    tracking, by each of said one or more gateways, the amount of processing performed by said one or more gateways;
    communicating, by each of said one or more gateways, their respective amount of processing performed to a usage management system communicatively coupled to said one or more gateways; and
    determining if each of said one or more gateways is at a pre-selected processing capacity based on the amount of processing performed by each of said one or more gateways.

11. The method of claim 10 wherein said processing performed includes handling of messages received from said one or more network elements.

12. The method of claim 10 wherein said tracking step comprises the steps of:
    executing software code by each of said one or more gateways to compute said amount of processing performed, said software code including code implemented within an Application Program Interface (API);
    invoking, by said one or more gateways, said API to maintain a count of a type of processing when said type of processing occurs within said one or more gateway;
    tracking an amount of different types of processing including handling of different types of messages from said one or more network elements; and
    executing code, in each of said one or more gateways, to increment a count maintained for one of said different types of processing responsive to an occurrence of said one type of processing.

13. The method of claim 12 wherein said invoking step comprises the step of:
    passing a descriptor of said type of processing to said API.

14. The method of claim 10 wherein said communicating step comprises the step of:
    responding to polling by said usage management system of said one or more gateways for said amount of processing performed.

15. The method of claim 10 further comprising the step of:
    electronically communicating, by said usage management system, said amount of processing performed to a recipient.

16. The method of claim 10 wherein said method is implemented by software code executable within said one or more gateways.

17. The method of claim 10 wherein said usage management system is communicatively coupled to a plurality of said one or more gateways, said method further comprising the step of:
    said usage management system compiling usage information received from said plurality of said one or more gateways.

18. The method of claim 17 further comprising the step of:
    said usage management system electronically communicating compiled usage information to a recipient.

19. The method of claim 10 further comprising:
    said usage management system electronically communicating said amount of processing performed received from said one or more gateways to a recipient.

20. A method as in claim 10, further comprising:
    charging a user of a respective gateway of said one or more gateways a fee based on the amount of processing performed by the respective gateway.

21. A gateway responsible for managing one or more network elements, said gateway comprising:
    means for handling messages received from one or more network elements to which said gateway is communicatively coupled;
    means for tracking an amount of processing performed by said gateway in handling said messages received from said one or more network elements; and
    means for determining if said at least one gateway is at a pre-selected processing capacity based on said measured amount of processing.

22. The gateway of claim 21 wherein said handling means includes a processor and software code executable by said processor.

23. The gateway of claim 21 wherein said tracking means includes software code implemented within an Application Program Interface (API) executable to increment a first count to track said amount of processing performed;
    wherein said API includes functionality that can be invoked to maintain a second count of one or more types of processing;
    wherein said software code, upon occurrence of a type of processing, invokes said functionality of said API to increment said second count for said one or more types of processing; and
    wherein said software code invokes said functionality by passing a descriptor of said type of processing to said API, and wherein said API maintains a third count for said descriptor.

24. The gateway of claim 21 wherein the tracking means includes software code executable to track an amount of different types of processing;
    wherein said software code increments a count maintained for a particular one of said different types of processing upon occurrence of said particular one type of processing;

wherein said different types of processing includes handling of different types of messages from said one or more network elements.

25. The gateway of claim 21 further comprising communicative coupling to a usage management system, wherein said gateway is operable to communicate said amount of processing performed to said usage management system.

26. A gateway as in claim 21, further comprising:

means for charging a user of said gateway a fee based on the tracked amount of processing performed by the gateway.

* * * * *